July 11, 1950 G. C. LARSON 2,514,957

HIGH-FREQUENCY TUNING DEVICE

Filed June 27, 1944 2 Sheets-Sheet 1

INVENTOR
GILBERT C. LARSON
BY Harry C. Page
ATTORNEY

July 11, 1950 G. C. LARSON 2,514,957

HIGH-FREQUENCY TUNING DEVICE

Filed June 27, 1944 2 Sheets-Sheet 2

INVENTOR
GILBERT C. LARSON
BY Harry C. Page
ATTORNEY

Patented July 11, 1950 2,514,957

UNITED STATES PATENT OFFICE 2,514,957

HIGH-FREQUENCY TUNING DEVICE

Gilbert C. Larson, Bayside, N. Y., assignor, by mesne assignments, to Hazeltine Research, Inc., Chicago, Ill., a corporation of Illinois Application June 27, 1944, Serial No. 542,375

12 Claims. (Cl. 178—44)

1

Figure 1:
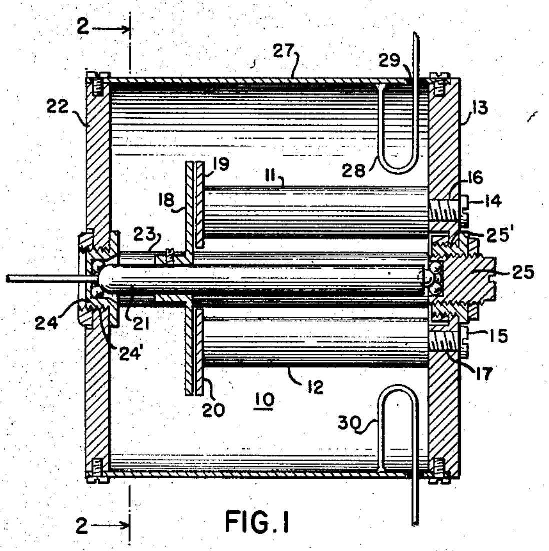

The present invention relates to high-frequency tuning devices and, particularly, to such devices of the type which utilize the resonant properties of wave-signal transmission lines. In greater particularity, the invention relates to a tuning device in which the effective electrical length of a transmission line is varied by an adjustable condenser to effect tuning of the device over a predetermined frequency range.

It frequently is desirable in high-frequency apparatus to provide a resonant wave-signal circuit having relatively low resistance for high-frequency currents, a large ratio of inductive reactance to resistance, and good frequency stability. Wave-signal transmission lines short-circuited at one end and having a nominal electrical length of an odd number of quarter-wave lengths at the operating frequency have resonant properties which render them suitable for this purpose and may be so constructed that they exhibit the desirable characteristics last mentioned.

As is well known, a quarter-wave transmission line short-circuited at one end has a value of impedance measured at its open end which varies with its effective electrical length. In using such lines as resonant circuits, it is, of course, desirable that the open end of the line shall always have maximum impedance at the operating frequency. In order that the effective electrical length of the line may be readily varied, thus to tune the line so that it has maximum impedance at any operating frequency in a range of such frequencies, it has been proposed that an adjustable condenser be connected across the open end of the line to provide a high-frequency tuning device. The condenser plates are individually mounted directly upon and supported by the conductors of the line. One of the conductors is slidably supported with relation to the other for purposes of varying the spacing between the condenser plates or is rotatably supported to vary the area over which the condenser plates are in opposing relation. All of these proposed arrangements have the disadvantage that they necessarily involve sliding electrical connections or contacts between the adjustable conductor and its support. The support of necessity is included in the electrical circuit of the transmission line with the result that the sliding connections or contacts mentioned must be carefully designed and frequently serviced, thus increasing the cost and complexity of the tuning device. There is the further disadvantage that even the best designed sliding connections or contacts cause undesirable noise disturbances in a wave-signal apparatus using such tuning device and, equally important, not only lower the ratio of the inductive reactance to resistance, or Q, of the tuning device, but additionally result in very erratic variations of it Q over the tuning range.

2

It usually is desirable that the tuning device be enclosed within a metallic shielding housing and it is conventional practice to continue the adjustable conductor of the transmission line in the tuning device last described outside of the housing to provide a manually adjustable member by which to vary the spacing between the condenser plates. There is the additional disadvantage with the last-mentioned type of tuning device that the portion of the conductor which is extended exteriorly of the housing seldom is at ground potential since the portion of the conductor inside the housing necessarily conducts substantial wave-signal current. The exterior portion of this conductor must therefore be coupled to an external manually adjustable tuning knob or the like by means of complicated electrical isolating devices in order that the frequency or stability of the device shall not be disturbed by proximity of the hand during a tuning adjustment. Since the portion of the conductor extending exteriorly of the housing can be maintained at ground potential only with great difficulty, a serious problem is presented of preventing the undesirable transfer of wave-signal energy between the external portion of the conductor and other near-by wave-signal circuits.

It is an object of the present invention, therefore, to provide a new and improved high-frequency tuning device, adjustable over a predetermined frequency range, which avoids one or more of the disadvantages and limitations of prior tuning devices of the type described.

It is a further object of the invention to provide a new and improved high-frequency tuning device which is adjustable over a predetermined frequency range and which does not involve or require the use of sliding connections or contacts in the effective electrical portion of its construction.

It is an additional object of the invention to provide a new and improved high-frequency tuning device, adjustable over a predetermined frequency range, the construction of which is not only exceptionally simple and sturdy but is readily adapted to effect compensation to a desired degree of variations of the tuning device constants with temperature.

It is a further object of the invention to provide a high-frequency tuning device, adjustable over a predetermined frequency range, which has high-frequency stability and a relatively permanent frequency calibration and one which involves in its construction no dielectric other than air, thus minimizing loss of wave-signal energy.

It is an additional object of the invention to provide a high-frequency tuning device which is adjustable over a predetermined frequency range and one in which such range may be easily and readily adjusted to any desired value within a range of values in the frequency spectrum.

It is a further object of the invention to provide a new and improved high-frequency tuning device, adjustable over a predetermined frequency range, which is adapted to be enclosed within a conductive shielding housing and one in which a conductive tuning shaft extending exteriorly of the housing is at zero wave-signal potential both within and without the housing and thus is not subject to undesirable capacitive hand effects during a tuning adjustment or to undesirable coupling of wave-signal energy to adjacent wave-signal circuits.

In accordance with the invention, a high-frequency tuning device, adjustable over a predetermined frequency range, comprises a transmission line open at one end and effectively short-circuited at the other by a conductive member and including a pair of parallel conductors approximately an odd number of quarter-wave lengths long at a frequency in the range, and capacitive means positioned at the open end of the line for tuning the device over the aforesaid range and including a movable condenser plate adapted to move into overlapping spaced relation with the ends of both of the conductors. The tuning device includes a shaft rotatably supported by the aforesaid conductive member between and approximately equidistant from the conductors in the median plane thereof rotatably to support the movable condenser plate, the support of the shaft by the member normally preventing axial movement of one end of the shaft proximate to a corresponding end of the line.

For a better understanding of the present invention, together with other and further objects thereof, reference is had to the following description taken in connection with the accompanying drawings, and its scope will be pointed out in the appended claims.

Figure 2:
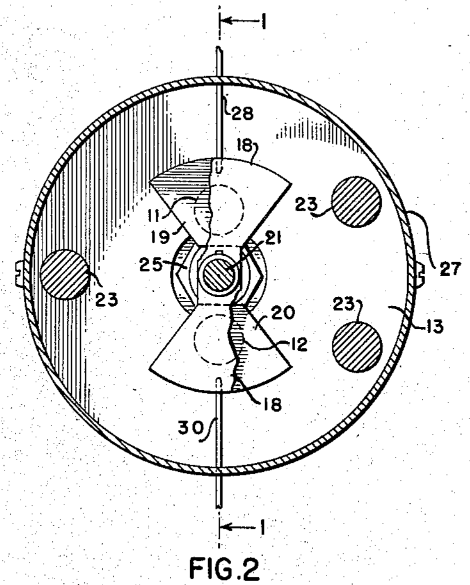
Figure 3:
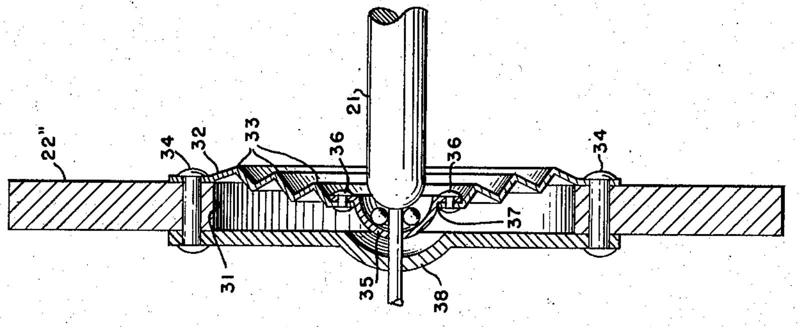
Figure 4:
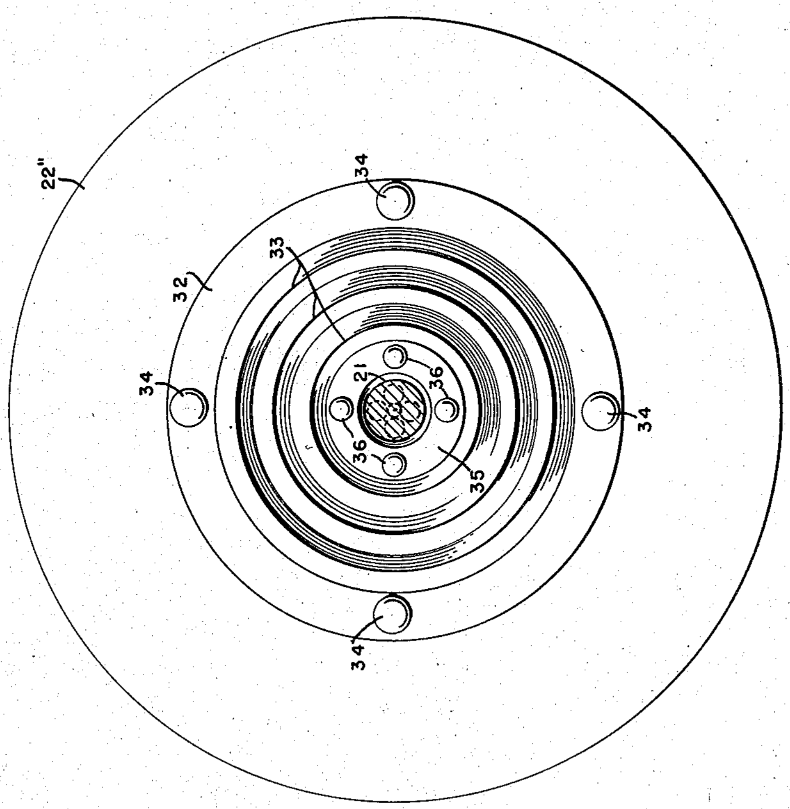

Referring now to the drawings, Fig. 1 is an elevational view illustrating a high-frequency tuning device embodying the present invention; Fig. 2 represents an end cross-sectional view of the tuning device taken along the plane 2—2 of Fig. 1; and Figs. 3 and 4 illustrate a portion of a tuning device embodying a modified form of the invention.

Referring now more particularly to Fig. 1 of the drawings, there is illustrated a high-frequency tuning device, adjustable over a predetermined frequency range, embodying the present invention in a preferred form. The tuning device includes a transmission line 10 open at one end and effectively short-circuited at the other and including a pair of rigid parallel conductors 11, 12 having an effective electrical length equal approximately to an odd number of quarter-wave lengths at a frequency in the aforesaid range. In greater particularity, the tuning device includes a conductive disc member 13 and means for supporting the conductors 11, 12 in parallel relation from the member 13 and in electrical engagement therewith to provide a rigid self-supporting transmission line short-circuited at one end by the member 13 and having an effective electrical length equal approximately to a quarter-wave length at a predetermined frequency in the tuning range. The means last mentioned comprise machine screws 14 and 15 which extend through apertures 16, 17 of the member 13 into threaded engagement with the respective conductors 11 and 12. The conductors 11, 12 are thus electrically and mechanically secured to the conductive member 13. The ratio of the diameter of either conductor to the spacing between the conductors preferably is approximately equal to 1/2.7, this ratio providing a substantially maximum ratio of inductive reactance to resistance, or maximum Q. In the relationship last expressed, it is the surface area and thus the circumference of the conductors which largely affects the maximum Q of the tuning device. Since the circumference is equal to $\pi$ times the conductor diameter, the relationship mentioned may be expressed in another manner; namely, that substantially maximum Q is attained when the ratio of the circumference of either conductor to the spacing therebetween is equal approximately to $\pi/2.7$.

The tuning device also includes capacitive means positioned at the open end of the line 10 for tuning the device over its tuning range and including a movable planar condenser plate 18 normal to the axis of the conductors 11, 12 and adapted to move into overlapping spaced relation with the ends of both of the conductors. For some applications, the conductors 11, 12 may have sufficiently large cross-sectional area that their end surfaces provide with the movable condenser plate 18 values of maximum and minimum capacitances adequate to adjust the device over a desired frequency range. For many applications, however, it is preferable to increase the value of maximum capacitance by the provision of a pair of planar stationary condenser plates 19 and 20 supported on and electrically secured to the ends of the respective conductors 11 and 12 normal to the axis thereof. As more clearly evident in Fig. 2, the stationary condenser plates 19, 20 and the movable plate 18 preferably have such configuration as to provide a butterfly or balanced type of condenser having balanced capacities to ground.

The tuning device includes a rotatable shaft 21 for the movable plate 18 and means for supporting the shaft approximately equidistant from the conductors 11, 12 in the median plane thereof and for normally preventing axial movement of one end of the shaft 21 proximate to a corresponding end of the transmission line 10. This means comprises the conductive member 13 and a similar conductive disc member 22 which is maintained in spaced coaxial relation with the disc member 13 by a plurality of rods 23, shown more clearly in Fig. 2, spaced around the members 13 and 22 near their periphery. In greater particularity, the means for supporting the shaft 21 comprises a journal 24, of the roller-bearing type, threaded through an aperture 24' of the conductive member 22 for supporting one end of the shaft and a thrust bearing 25, also of the roller-bearing type, threaded through an aperture 25' in the conductive member 13 to support the other end of the shaft.

It may be noted that the shaft 21 does not significantly affect the previously mentioned ratio of conductor diameter, or circumference, to spacing for maximum Q. This is because the shaft, as will presently be explained in greater detail, is positioned throughout its length in a neutral or zero-potential region of the tuning device and thus does not conduct any appreciable values of wave-signal current. The Q of the transmission line 11, 12 is defined as the ratio of the energy stored in the line to the energy dissipated therein during each cycle of the wave signal applied to the tuning device. It is thus apparent that, in the absence of wave-signal current along the shaft 21, the latter neither affects the storage of energy in the transmission line nor the dissipation of power thereby.

The conductive members 13 and 22 essentially comprise end-wall members of a cylindrical housing which includes a conductive cylindrical member 27 preferably split longitudinally and arranged to fit over the peripheries of the members 13 and 22. The member 27 is secured to the latter by any suitable means, for example by machine screws as indicated in Fig. 1.

Means is also provided in the tuning device for coupling the transmission line 10 to an external wave-signal circuit, not shown. This means comprises a loop 28 inductively coupled to the conductor 11 of the transmission line 10 near the short-circuited end of the latter. The loop 28 extends through an insulating bushing 29 provided in an aperture of the cylindrical member 27 and the end of the loop is electrically connected to the member 27. A loop 30, similar to the loop 28, is inductively coupled to the conductor 12 of the transmission line 10 near the short-circuited end of the latter to enable the transmission line to be coupled to a second wave-signal circuit if desired. The cylindrical member 27 is preferably split longitudinally to facilitate the assembly of the loops 28 and 30 therewith and later to permit its assembly with the end members 13 and 22.

Considering now the operation of the high-frequency tuning device just described, wave-signal energy from an external wave-signal circuit, not shown, is coupled by one of the loops 28 or 30 into the transmission line 10 to set up along the conductors 11 and 12 standing waves of voltage and current. As is well known, the standing wave of current has maximum amplitude in the region of the conductive disc member 13 so that the loops 28 and 30 are positioned in the region of maximum magnetic field intensity and thus may be closely coupled if desired to the transmission line. The standing wave of voltage on the transmission line has maximum amplitude at the open end of the transmission line 10, in the region of the stationary condenser plates 19, 20, and the phase of the voltage on one conductor is opposite that on the other. The adjustable condenser, comprising the stationary plates 19, 20 and the movable plate 18, thus is subjected to the maximum voltage developed along the transmission line and is effective substantially to change the effective electrical length of the latter by virtue of the capacitive loading, or lumped capacitance, which the condenser provides at this point. The construction of the tuning device is so sturdy that the movable condenser plate 18 may be quite closely spaced to the stationary plates 19 and 20. This enables a wide range of capacitance adjustment and insures a substantial range of adjustment of the effective electrical length of the transmission line 10.

It should be noted in this regard that the adjustment of the condenser does not involve the use of any sliding connections or contacts in any portion of the tuning device which is required to carry wave-signal currents, all of such currents being confined to the conductors 11, 12, the end-wall member 13, and the condenser plates 18, 19 and 20. Substantially no wave-signal currents flow along the axis of the condenser shaft 21 which is positioned in a neutral or zero-potential region of the tuning device; that is, the shaft 21 is placed throughout its length equidistant between the two conductors 11, 12 in a region of zero electrical potential and in a region of equipotential magnetic field. This freedom from the use of sliding connections or contacts minimizes the introduction of noise into any external wave-signal circuit coupled to the tuning device, such as has characterized the operation of prior high-frequency tuning devices of this type. This feature also insures that the ratio of inductive reactance to resistance, or Q, of the tuning device shall always be that established by the constants of the transmission line 10 and that this ratio shall experience no erratic variations with adjustments of the tuning device.

An additional important feature of a tuning device constructed in accordance with the invention resides in the temperature compensation which may be effected by suitable design of certain constructional details. It will be apparent that the conductors 11 and 12, the shaft 21, the spacing columns 23 and the cylindrical member 27 experience changes of their physical length with temperature. This, of course, not only effects a change of the effective electrical length of the transmission line 10, but in addition varies the spacing between the fixed condenser plates 19, 20 and the movable plate 18, thus to change the capacitance of the condenser for any given adjustment thereof. The extent to which the constants of the transmission line 10 vary with temperature is determined, of course, by the temperature coefficient of expansion of the material of its conductors 11 and 12. The change of capacitance of the condenser, comprising the elements 18, 19 and 20, with temperature is determined by the temperature coefficient of expansion not only of the material of the conductors 11 and 12, but also by that of the shaft 21, the spacing columns 23, and possibly the cylindrical housing member 27. Since one end of the shaft 21 is supported by the thrust bearing 25, and thus may not move axially with relation to the end-wall member 13, and since the conductors 11 and 12 are each secured at one end of the latter, the shaft and conductors must expand in the same direction so that changes of capacitance of the condenser with temperature are inter-related with changes of the electrical constants of the transmission line 10 with temperature. Consequently, by constructing the conductors 11 and 12 of one material and the members 21 and 23, and possibly the cylindrical member 27, of another material having a temperature coefficient of expansion suitably related to that of the first material, the tuning device may be so temperature-compensated that its resonant frequency remains substantially constant with temperature, or, if desired, either increases or decreases with temperature.

Wave-signal energy coupled into the transmission line 10 by the use of one of the loops 28 or 30 as heretofore described may, if desired, be applied to a second wave-signal circuit, not shown, by coupling the latter to the other loop 28 or 30.

Figs. 3 and 4 represent a portion of a complete tuning device embodying a modified form of the invention which has the important advantage that it permits an initial adjustment of the spacing between the condenser plates 18 and 19, 20 by which to adjust the tuning device to operate over a desired range of operating wave lengths. Elements of Figs. 3 and 4 which are similar to elements of Fig. 1 are designated by similar reference numerals and analogous elements by similar reference numerals double primed. In this modified form of tuning device, the conductive disc member 22'' is provided with a relatively large coaxial aperture 31 into which extends an axially resilient bearing support member 32 having annular folds or corrugations 33 to permit slight axial extension of the member 32 while preventing any radial movement of the center thereof. The latter is secured, as by rivets 34, in coaxial relation with the disc member 22''. An outer ball-bearing race 35 is secured, as by rivets 36, in a coaxial aperture 37 of the resilient member 32. The end of the shaft 21 is rounded, as in the Fig. 1 construction, to provide the inner ball-bearing race as shown. A rigid conductive disc member 38 is secured on the exterior surface of the disc member 22'' to close the aperture 31 thereof, thus to provide effective electrical shielding of this portion of the tuning device.

The operation of this modified form of the invention is essentially similar to that described in connection with the Fig. 1 arrangement except that the resilient mounting, provided by the resilient member 32, for the ball-bearing race 35 enables a slight axial movement of the shaft 21 under control and adjustment of the thrust bearing 25, shown in Fig. 1, thus to permit an initial adjustment of the spacing of the condenser plates 18 and 19, 20. The resilient member 32 has sufficient resilience that it always biases the shaft 21 toward the thrust bearing 25 so that the normal axial position of the shaft 21 is determined by adjustment of the latter. The construction of the resilient member 32, however, is such as to minimize any radial movement of the end of the shaft 21 which would undesirably permit movement of the shaft from a position approximately equidistant from the condctors 11 and 12 in the median plane thereof. It will thus be apparent that the resilient member 32 comprises means for supporting the shaft 21 approximately equidistant from the conductors 11, 12 in the median plane thereof and for providing an initial axial adjustment of the shaft to vary at least one limit of the range of adjustment of the condenser comprised by elements 18, 19 and 20, while at the same time normally preventing, in a selected position of adjustment, any axial movement of one end of the shaft proximate to a corresponding end of the transmission line formed by conductors 11 and 12. In this connection, it will be understood that the statement in the appended claims that the shaft supporting means normally prevents axial movement of one end of the shaft proximate to a corresponding end of the transmission line is intended to mean that the supporting means in normal operation of the tuning device prevents such axial movement of the end of the shaft. The statement does not preclude an initial axial adjustment of the shaft, such as may be provided by the modified form of the invention shown in Figs. 3 and 4, by which initially to adjust the tuning device to operate over a predetermined desired range of operating wave lengths.

While the tuning device has been described as having inductive-coupling loops 28 and 30 by which the device is coupled to one or more external wave-signal circuits, not shown, it will be apparent that such coupling may also be provided by a capacitive probe or probes extending through the housing member 27, in insulated relation therewith, into proximity with one of the conductors 11 or 12. The size and the spacing of a capacitive probe of this nature from a selected one of the conductors 11 or 12 are dependent in large part upon the impedance of the external wave-signal circuit, not shown, and the degree of magnitude of coupling desired between the tuning device and such external circuit.

A high-frequency tuning device constructed in accordance with the invention possesses high-frequency stability and a relatively permanent frequency calibration. There are the additional advantages that the tuning device of the invention minimizes the loss of wave-signal energy, since no dielectric other than air is used in its construction, is fully shielded to minimize undesirable coupling between the transmission line of the tuning device and external wave-signal circuits, and may be initially adjusted to operate over a desired range of wave lengths.

As previously explained, the shaft 21 extends throughout its length in a region of substantially zero electric potential and in an equipotential magnetic field and thus is not required to carry wave-signal currents. It will thus be apparent that the condenser shaft has substantially zero potential along its length and consequently is free from any tendency undesirably to couple wave-signal energy between the tuning device and adjacent wave-signal circuits. Additionally, this fact ensures a high degree of freedom from any tendency of the frequency or stability of the tuning device being upset when the adjusting shaft 21 is manually grasped to effect a tuning adjustment.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high-frequency tuning device adjustable over a predetermined frequency range comprising, a transmission line open at one end and effectively short-circuited at the other by a conductive member and including a pair of parallel conductors having an effective electrical length equal approximately to an odd number of quarter-wave lengths at a frequency in said range, capacitive means positioned at said open end of said line for tuning said device over said range and including a movable condenser plate adapted to move into overlapping spaced relation with the ends of both of said conductors, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

2. A high-frequency tuning device adjustable over a predetermined frequency range comprising, a transmission line open at one end and effectively short-circuited at the other by a conductive member and including a pair of parallel conductors having an effective electrical length equal approximately to a quarter-wave length at a frequency in said range, capacitive means positioned at said open end of said line for tuning said device over said range and including a movable condenser plate adapted to move into overlapping spaced relation with the ends of both of said conductors, and a shaft rotatably supported by said member between and approximately equidistant from said conductors in the median plane thereof rotatably to support said movable condenser plate, the support of said shaft by said members normally preventing axial movement of one end of said shaft proximate to a corresponding end of said line.

3. A high-frequency tuning device adjustable over a predetermined frequency range comprising, a transmission line open at one end and effectively short-circuited at the other by a conductive member and including a pair of parallel conductors having an effective electrical length equal approximately to an odd number of quarter-wave lengths at a frequency in said range, the ratio of the transverse cross-sectional circumference of said conductors to the spacing therebetween being approximately equal to $\pi/2.7$ to provide a substantially maximum ratio of inductive reactance to resistance, capacitive means positioned at said open end of said line for tuning said device over said range and including a movable condenser plate adapted to move into overlapping spaced relation with the ends of both of said conductors, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

4. A high-frequency tuning device adjustable over a predetermined frequency range comprising, a transmission line open at one end and effectively short-circuited at the other by a conductive member and including a pair of parallel conductors having an effective electrical length equal approximately to an odd number of quarter-wave lengths at a frequency in said range, capacitive means positioned at said open end of said line for tuning said device over said range and including a planar movable condenser plate normal to the axes of said conductors and adapted to move into overlapping spaced relation with the ends of both of said conductors, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

5. A high-frequency tuning device adjustable over a predetermined frequency range comprising, a transmission line open at one end and effectively short-circuited at the other by a conductive member and including a pair of parallel conductors having an effective electrical length equal approximately to an odd number of quarter-wave lengths at a frequency in said range, capacitive means positioned at said open end of said line for tuning said device over said range and including a pair of stationary condenser plates electrically and mechanically connected to the ends of individual ones of said conductors, a movable condenser plate adapted to move into overlapping spaced relation with both of said stationary plates, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

6. A high-frequency tuning device adjustable over a predetermined frequency range comprising, a transmission line open at one end and effectively short-circuited at the other by a conductive member and including a pair of parallel conductors having an effective electrical length equal approximately to an odd number of quarter-wave lengths at a frequency in said range, capacitive means positioned at said open end of said line for tuning said device over said range and including a pair of stationary planar condenser plates electrically and mechanically connected to the ends of individual ones of said conductors normal to the axes thereof, a movable planar condenser plate normal to the axes of said conductors and adapted to move into overlapping spaced relation with both of said stationary plates, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

7. A high-frequency tuning device adjustable over a predetermined frequency range comprising, a transmission line open at one end and effectively short-circuited at the other by a conductive member and including a pair of parallel conductors having an effective electrical length equal approximately to an odd number of quarter-wave lengths at a frequency in said range, capacitive means positioned at said open end of said line for tuning said device over said range and including a pair of stationary condenser plates electrically and mechanically connected to the ends of individual ones of said conductors, a movable condenser plate adapted to move into overlapping spaced relation with both of said stationary plates, said stationary and movable plates having a configuration to provide a butterfly type of condenser, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

8. A high-frequency tuning device adjustable over a predetermined frequency range comprising, a pair of rigid conductors each having an effective electrical length equal approximately to an odd number of quarter-wave lengths at a frequency in said range, a conductive member, means for supporting said conductors in parallel relation from said member and in electrical engagement therewith, thereby to provide a rigid self-supporting transmission line open at one end and short-circuited at the other, capacitive means positioned at said open end of said line for tuning said device over said range and including a movable condenser plate adapted to move into overlapping spaced relation with the ends of both of said conductors, and a shaft rotatably supported by said member between and approximately equidistant from said conductors in the median plane thereof rotatably to support said movable condenser plate, the support of said shaft by said member normally preventing axial movement of one end of said shaft proximate to a corresponding end of said line.

9. A high-frequency tuning device adjustable over a predetermined frequency range comprising, a pair of rigid conductors each having an effective electrical length equal approximately to an odd number of quarter-wave lengths at a frequency in said range, a conductive housing including a conductive wall member, means for supporting said conductors in parallel relation within said housing and in electrical engagement with said member, thereby to provide a rigid self-supporting transmission line open at one end and short-circuited at the other, capacitive means positioned at said open end of said line for tuning said device over said range and including a movable condenser plate adapted to move into overlapping spaced relation with the ends of both of said conductors, and a shaft rotatably supported by said conductive wall member between and approximately equidistant from said conductors in the median plane thereof rotatably to support said movable condenser plate, the support of said shaft by said wall member normally preventing axial movement of one end of said shaft proximate to a corresponding end of said line.

10. A high-frequency tuning device adjustable over a predetermined frequency range comprising, a pair of rigid conductors each having an effective electrical length equal approximately to an odd number of quarter-wave lengths at a frequency in said range, a conductive member, means for supporting said conductors in parallel relation from said member and in electrical engagement therewith, thereby to provide a rigid self-supporting transmission line open at one end and short-circuited at the other, capacitive means positioned at said open end of said line for tuning said device over said range and including a movable condenser plate adapted to move into overlapping spaced relation with the ends of both of said conductors, a rotatable shaft for said movable plate, and means including a thrust bearing supported by said conductive member for supporting said shaft approximately equidistant from said conductors in the median plane thereof and for normally preventing axial movement of that end of said shaft proximate to the short-circuited end of said line.

11. A high-frequency tuning device adjustable over a predetermined frequency range comprising, a transmission line open at one end and effectively short-circuited at the other and including a pair of parallel conductors having an effective electrical length equal approximately to an odd number of quarter-wave lengths at a frequency in said range, capacitive means positioned at said open end of said line for tuning said device over said range and including a movable condenser plate adapted to move into overlapping spaced relation with the ends of both of said conductors, a rotatable shaft for said movable plate, and means for supporting said shaft approximately equidistant from said conductors in the median plane thereof and for providing an initial axial adjustment of said shaft to vary at least one limit of the range of adjustment of said capacitive means while normally preventing, in a selected position of adjustment, axial movement of one end of said shaft proximate to a corresponding end of said line.

12. A high-frequency tuning device adjustable over a predetermined frequency range comprising: a transmission line open at one end and effectively short-circuited at the other and including a pair of parallel conductors having an effective electrical length equal approximately to an odd number of quarter-wave lengths at a frequency in said range; capacitive means positioned at said open end of said line for tuning said device over said range and including a movable condenser plate adapted to move into overlapping spaced relation with the ends of both of said conductors; a rotatable shaft for said movable plate; and means for supporting said shaft approximately equidistant from said conductors in the median plane thereof and for preventing any appreciable radial movement of said shaft while permitting an initial axial adjustment of said shaft to vary at least one limit of the range of adjustment of said capacitive means; said supporting means normally preventing, in a selected position of adjustment, axial movement of one end of said shaft proximate to a corresponding end of said line.

GILBERT C. LARSON.

REFERENCES CITED

The following references are of record in the file of this patent:

UNITED STATES PATENTS

| Number | Name | Date |
|---|---|---|
| 2,198,025 | Davies et al. | Apr. 23, 1940 |
| 2,216,964 | Stepp | Oct. 8, 1940 |
| 2,232,592 | Davies | Feb. 18, 1941 |
| 2,310,695 | Higgins | Feb. 9, 1943 |
| 2,365,207 | Moles | Dec. 19, 1944 |
| 2,366,750 | Pray | Jan. 9, 1945 |
| 2,400,619 | Woodward | May 21, 1946 |
| 2,402,443 | Peterson | June 18, 1946 |